US010011004B2

(12) United States Patent
Fukui et al.

(10) Patent No.: US 10,011,004 B2
(45) Date of Patent: Jul. 3, 2018

(54) CLAMP APPARATUS

(71) Applicant: SMC CORPORATION, Chiyoda-ku (JP)

(72) Inventors: Chiaki Fukui, Abiko (JP); Kazuyoshi Takahashi, Koto-ku (JP); Hideki Sasaki, Toride (JP); Masaharu Kobayashi, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 327 days.

(21) Appl. No.: 14/760,924

(22) PCT Filed: Dec. 11, 2013

(86) PCT No.: PCT/JP2013/083809
§ 371 (c)(1),
(2) Date: Jul. 14, 2015

(87) PCT Pub. No.: WO2014/115444
PCT Pub. Date: Jul. 31, 2014

(65) Prior Publication Data
US 2015/0343608 A1 Dec. 3, 2015

(30) Foreign Application Priority Data
Jan. 28, 2013 (JP) ................................ 2013-013658

(51) Int. Cl.
*B23Q 3/08* (2006.01)
*B25B 5/04* (2006.01)
(Continued)

(52) U.S. Cl.
CPC ................ *B25B 5/04* (2013.01); *B25B 5/064* (2013.01); *B25B 5/122* (2013.01)

(58) Field of Classification Search
USPC ....................... 269/34, 157, 228, 239, 254 R
See application file for complete search history.

(56) References Cited

U.S. PATENT DOCUMENTS 2,835,291 A * 5/1958 Blatt ........................ B21J 15/42 24/494
3,149,832 A * 9/1964 McPherson ............... B25B 5/12 269/228

(Continued)

FOREIGN PATENT DOCUMENTS

CN 201415334 Y * 3/2010 ............... B23C 3/30
JP 11-340688 * 12/1999 ............ H05K 13/04
JP 4950123 B2 6/2012

OTHER PUBLICATIONS

Combined Office Action and Search Report issued Sep. 21, 2016 in Chinese Patent Application No. 201380071462.6 (with English translation).

(Continued)

*Primary Examiner* — Joseph J Hail
*Assistant Examiner* — Shantese McDonald
(74) *Attorney, Agent, or Firm* — Oblon, McClelland, Maier & Neustadt, L.L.P.

(57) ABSTRACT

A driving force transmission mechanism of a clamp apparatus includes first link arms, which are pivotally supported for rotation on ends of first and second piston rods, and second link arms, which connect other ends of the first link arms to respective ends on one end side of first and second clamp arms. Further, first rollers, which are provided on the one end of the first link arms, are guided in a horizontal direction along guide grooves of first guide members, and second rollers, which are provided on the other ends of the first link arms and the second link arms, are guided in a vertical direction along guide grooves of second guide members.

7 Claims, 5 Drawing Sheets

(51) Int. Cl.
*B25B 5/06* (2006.01)
*B25B 5/12* (2006.01)

(56) References Cited

U.S. PATENT DOCUMENTS

| | | | | | |
|---|---|---|---|---|---|
| 3,170,214 | A | * | 2/1965 | Cochrane | B25B 5/12<br>24/494 |
| 3,689,058 | A | * | 9/1972 | Schraner | B25B 5/122<br>269/157 |

OTHER PUBLICATIONS

International Search Report and Written Opinion dated Mar. 27, 2014 in PCT/JP2013/083809 filed Dec. 11, 2013.

Office Action dated Sep. 1, 2015 in Japanese Patent Application No. 2013-013658 (with English translation of pertinent portion).

* cited by examiner

CLAMP APPARATUS

TECHNICAL FIELD

The present invention relates to a clamp apparatus for clamping a workpiece on an automated assembly line or the like.

BACKGROUND ART

Heretofore, for example, in an automated assembly line for automobiles, an assembly process has been carried out in which clamping is performed by a clamp apparatus under a condition in which pre-formed frames are positioned in an overlaid manner and the frames are welded together.

As one clamp apparatus of this type, for example, as disclosed in Japanese Patent No. 4950123, the clamp apparatus comprises a pair of clamp arms, the clamp arms being disposed on left and right sides and supported pivotally by pins, and an air cylinder that generates a driving force for rotating the clamp arms. By supplying a pressure fluid to the air cylinder, the driving force is transmitted to the clamp arms through a base connected to the end of a piston rod. By rotation of the clamp arms respectively through the pins, distal ends of the clamp arms are operated to open and close, to thereby grip a workpiece such as a frame or the like from left and right sides thereof.

SUMMARY OF INVENTION

However, with the aforementioned clamp apparatus, which is driven by an air cylinder as a drive unit thereof, in the event that a large clamping force is to be generated with respect to the workpiece, it is necessary for a large-scale air cylinder to be adopted, leading to an increase in the size of the apparatus. This also leads to an increase in the consumption amount of the pressure fluid needed to drive the air cylinder, accompanied by an increase in running costs for the clamp apparatus.

A general object of the present invention is to provide a clamp apparatus in which a desired clamping force can be obtained without increasing the size of the clamp apparatus, and which enables a reduction in running costs through achievement of energy savings.

The present invention is characterized by a clamp apparatus for rotating a pair of clamp arms and thereby clamping a workpiece between the clamp arms, comprising:

a body;

a drive unit disposed on the body and for displacing displaceable members along an axial direction under the supply of a pressure fluid;

the pair of clamp arms supported rotatably with respect to the body, the clamp arms being disposed in confronting relation to each other; and a driving force transmission mechanism which connects ends of the displaceable members to ends of the clamp arms, and which transmits a driving force in the axial direction of the drive unit to the clamp arms for thereby rotating the clamp arms, wherein the driving force transmission mechanism comprises a toggle link mechanism having first link arms supported rotatably on the displaceable members through first support members provided on ends of the first link arms, and second link arms, which connect second support members provided on other ends of the first link arms and ends of the clamp arms, and which are supported rotatably, respectively, with respect to the second support members and the ends of the clamp arms, and wherein the first support members are disposed for displacement in the axial direction, and the second support members are disposed for displacement in a perpendicular direction perpendicular to the direction of displacement of the first support members.

According to the present invention, the driving force transmission mechanism that makes up the clamp apparatus comprises a toggle link mechanism having the first link arms, which are supported rotatably on the displaceable members through first support members, and the second link arms, which interconnect second support members supported on other ends of the first link arms and ends of the clamp arms, and which are supported rotatably with respect to the second support members and the ends of the clamp arms. Further, the first support members are disposed for displacement in the axial direction together with the displaceable members, whereas the second support members are disposed for displacement in a direction perpendicular to the direction of displacement of the first support members.

In addition, by displacement of the displaceable members under a driving action of the drive unit, the driving force is transmitted to ends of the clamp arms through the first and second link arms, and when the workpiece is clamped upon rotation of the clamp arms, by operation of the first and second link arms that function as a toggle link mechanism, the driving force is boosted in power and then transmitted to the clamp arms.

Accordingly, even if the driving force output from the drive unit is small, by boosting and transmitting the driving force through operation of the driving force transmission mechanism that functions as a toggle link mechanism made up from the first and second link arms, a desired clamping force can be obtained without increasing the size and scale of the drive unit. In addition, since the amount of pressure fluid consumed in the drive unit can be suppressed, energy savings and a reduction in running costs can be realized.

The above and other objects, features and advantages of the present invention will become more apparent from the following description when taken in conjunction with the accompanying drawings in which preferred embodiments of the present invention are shown by way of illustrative example.

DESCRIPTION OF EMBODIMENTS

Figure 1:
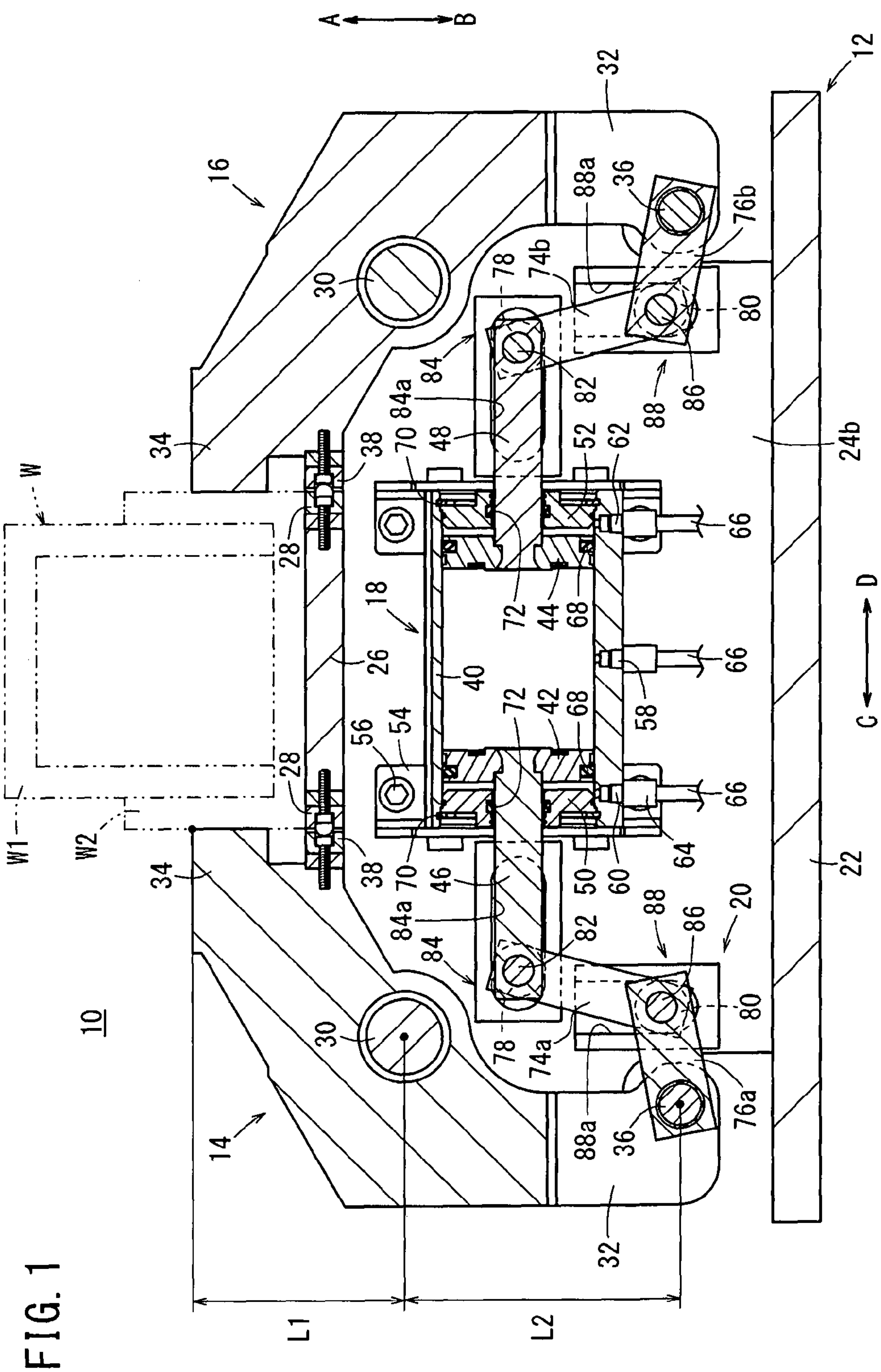
FIG. 1 is an overall cross sectional view of a clamp apparatus according to an embodiment of the present invention.

As shown in FIGS. 1 through 5, a clamp apparatus 10 includes a body 12, a pair of first and second clamp arms 14, 16, which are pivotally supported rotatably with respect to the body 12, a drive unit 18 fixed to the body 12, and a driving force transmission mechanism 20 that transmits a driving force of the drive unit 18 to the first and second clamp arms 14, 16.

The body 12 is constituted from a plate-shaped base 22, which is arranged horizontally, and a pair of plate members 24*a*, 24*b* (see FIG. 3), which are separated mutually by a predetermined distance, and are connected respectively to both opposite side surfaces of the base 22. The plate members 24*a*, 24*b* are disposed perpendicularly with respect to the base 22, and are formed with a predetermined height in an upward direction (the direction of the arrow A). Further, the base 22 is arranged, for example, on a floor surface or the like, and the clamp apparatus 10 is fixed in place by securing the base 22 using non-illustrated bolts or the like.

Further, on an upper part of the body 12, a ceiling portion 26 is disposed, which is connected to ends of the pair of plate members 24*a*, 24*b*. The ceiling portion 26 is arranged perpendicularly with respect to the direction of extension (the direction of arrows A and B) of the plate members 24*a*, 24*b*, and is arranged substantially centrally in the widthwise direction (the direction of arrows C and D) in the body 12. More specifically, the ceiling portion 26 is disposed substantially in parallel with the base 22. On the ceiling portion 26, receiving grooves 28 are formed respectively on side surfaces in confronting relation to the later-described first and second clamp arms 14, 16, and when a workpiece W is gripped by the clamp apparatus 10, the workpiece W is arranged on the upper surface of the ceiling portion 26.

The first and second clamp arms 14, 16 are formed substantially in the same shape, and are arranged mutually and symmetrically about the drive unit 18, and further are disposed between one of the plate members 24*a* and the other of the plate members 24*b*. Additionally, the first and second clamp arms 14, 16 are supported rotatably on the body 12 through arm pins (support shafts) 30, which are inserted through the first and second clamp arms 14, 16 substantially centrally in the longitudinal direction thereof and which are supported by the pair of plate members 24*a*, 24*b*.

The first and second clamp arms 14, 16 are L-shaped in cross-section, with bifurcated yoke portions 32 being formed on ends, i.e., one end side, thereof that are arranged on the side of the base 22 (in the direction of the arrow B), and gripping portions 34 for clamping the workpiece W being formed, respectively, on other ends, which are bent substantially perpendicularly with respect to the one end side.

Ends of later-described second link arms 76*a*, 76*b* are pivotally supported via link pins 36 on ends of the yoke portions 32.

The gripping portions 34 are formed, for example, with substantially rectangular shapes in cross section, and mutually confronting gripping surfaces thereof are formed as vertical surfaces substantially parallel with the longitudinal direction of the first and second clamp arms 14, 16.

Further, the arm pins 30 are inserted in the first and second clamp arms 14, 16, respectively, through holes thereof at locations where the other end sides are bent with respect to the one end sides. Moreover, below the gripping portions 34, positioning portions 38 are formed, respectively, which project with respect to the gripping surfaces of the gripping portions 34. At a time of clamping when the first and second clamp arms 14, 16 are made to approach each other and grip the workpiece W, the positioning portions 38 are brought into engagement, respectively, with the receiving grooves 28 of the ceiling portion 26.

In the first and second clamp arms 14, 16, as shown in FIG. 1, a first distance L1 from the arm pin 30 to the center of the gripping region of the workpiece W on the gripping portion 34, and a second distance L2 from the arm pin 30 to the link pin 36 are set such that the ratio between L1 and L2 is equal to a predetermined ratio (length ratio), and the second distance L2 is set to be greater than the first distance L1 (L1<L2).

The drive unit 18 is arranged between the pair of plate members 24*a*, 24*b*, and is disposed horizontally and separated a predetermined distance with respect to the base 22. The drive unit 18 comprises a fluid pressure cylinder including a cylindrical cylinder tube (cylinder main body) 40, a pair of first and second pistons (displaceable members) 42, 44 disposed displaceably in the interior of the cylinder tube 40, first and second piston rods (displaceable members) 46, 48, which are connected respectively to the first and second pistons 42, 44, and first and second rod covers 50, 52 disposed on respective opposite ends of the cylinder tube 40, and which displaceably support the first and second piston rods 46, 48, respectively.

Both end portions of the cylinder tube 40 are fixed to the plate member 24*b* by fixing bolts 56 through attachment brackets 54. In addition, first through third ports 58, 60, 62, which penetrate in directions (the directions of arrows A and B) perpendicular to the axial direction of the cylinder tube 40, are formed in a side surface of the cylinder tube 40. Communication between the exterior and the interior of the cylinder tube 40 is enabled through the first through third ports 58, 60, 62.

The first port (first port) 58 is disposed centrally in the axial direction (the direction of arrows C and D) of the cylinder tube 40, the second port (second port) 60 is disposed in the vicinity of one end of the cylinder tube 40 on the side (in the direction of the arrow C) of the first clamp arm 14, and the third port (second port) 62 is disposed in the vicinity of the other end of the cylinder tube 40 on the side (in the direction of the arrow D) of the second clamp arm 16. More specifically, the first through third ports 58, 60, 62 are separated from each other mutually in the axial direction (the direction of arrows C and D) of the cylinder tube 40.

In addition, tubes 66, which are connected to a non-illustrated pressure fluid supply source, are connected to the first through third ports 58, 60, 62 through respective couplings 64. Pressure fluid is supplied selectively either to the second and third ports 60, 62 or to the first port 58 under a switching action of a non-illustrated switching device. The tubes 66 are connected to the second and third ports 60, 62 so as to be capable of supplying pressure fluid simultaneously thereto.

The first and second pistons 42, 44 are disk shaped, for example, with piston packings 68 being installed through annular grooves on the outer circumferential surfaces thereof. By sliding contact of the piston packings 68 with the inner wall surface of the cylinder tube 40, leakage of pressure fluid between the cylinder tube 40 and the first and second pistons 42, 44 is prevented.

Additionally, the first piston 42 is arranged on one end side (in the direction of the arrow C) from the center along the axial direction of the cylinder tube 40, and the second piston 44 is arranged on the other end side (in the direction of the arrow D) from the center of the cylinder tube 40. More specifically, the first piston 42 and the second piston 44 are disposed in parallel in the interior of the cylinder tube 40, and are arranged at positions separated by the same distance respectively from the one end and the other end of the cylinder tube 40.

Ends of the first and second piston rods 46, 48 are inserted respectively through the centers of the first and second pistons 42, 44 and are connected integrally to the first and second pistons 42, 44 by crimping. Other ends of the first and second piston rods 46, 48 are inserted through the first and second rod covers 50, 52 and project respectively to the exterior from the one end and the other end of the cylinder tube 40. Stated otherwise, the first piston rod 46 and the second piston rod 48 extend mutually in directions away from each other.

After insertion of the first and second rod covers 50, 52 into the cylinder tube 40, the first and second rod covers 50, 52 are locked by locking rings 70, which are placed in engagement with the inner circumferential surface of the cylinder tube 40. By sliding contact of rod packings 72, which are installed on inner circumferential surfaces of the first and second rod covers 50, 52, with outer circumferential surfaces of the first and second piston rods 46, 48, leakage of pressure fluid is prevented between the first and second piston rods 46, 48 and the first and second rod covers 50, 52.

The driving force transmission mechanism 20 includes first link arms 74*a*, 74*b*, which are supported pivotally on other end portions of the first and second piston rods 46, 48, second link arms 76*a*, 76*b*, which connect the first link arms 74*a*, 74*b* to ends on one end side of the first and second clamp arms 14, 16, first rollers (rotating rollers) 78 that are supported pivotally on one end portions of the first link arms 74*a*, 74*b*, and second rollers (rotating rollers) 80 that are supported pivotally on other end portions of the first link arms 74*a*, 74*b* and other end portions of the second link arms 76*a*, 76*b*.

Figure 3:
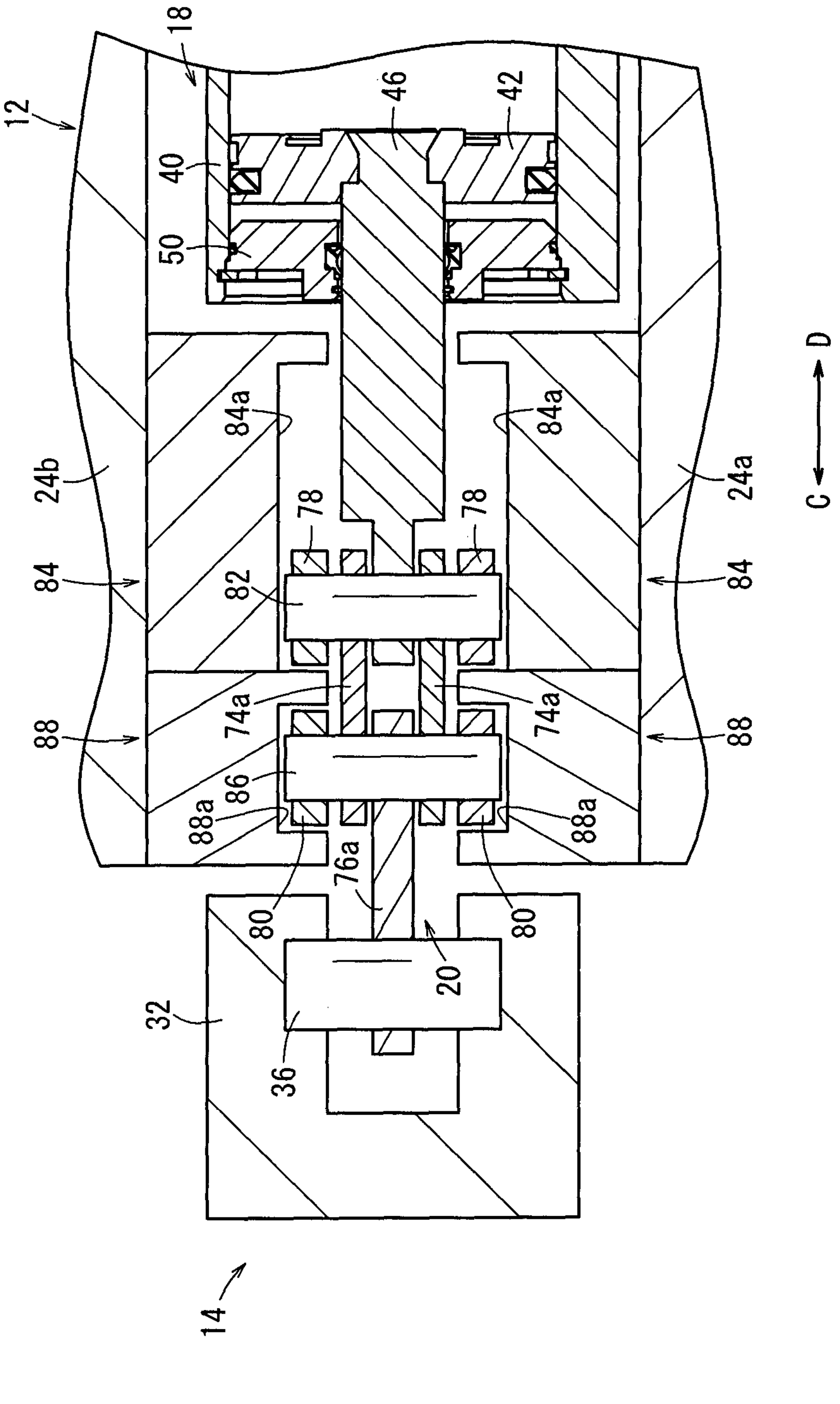
FIG. 3 is a cross sectional view taken along line III-III of FIG. 2.

The first link arms 74*a*, 74*b* are formed as plate-shaped members having a predetermined length in the longitudinal direction thereof. As shown in FIG. 3, one pair of the first link arms 74*a* are provided on the first piston rod 46 side while one pair of the first link arms 74*b* are provided on the second piston rod 48 side. The one end portions of the first link arms 74*a*, 74*b* are disposed in parallel, sandwiching the other end portions of the first and second piston rods 46, 48 therebetween, and are supported rotatably through first roller pins (first support members) 82.

Further, one pair of the first rollers 78 are disposed rotatably through the first roller pin 82 on outer sides of each pair of the first link arms 74*a*, 74*b*. The first rollers 78 are inserted in guide grooves (grooves) 84*a* of a pair of first guide members (guide means) 84, which are disposed respectively on inner wall surfaces of the pair of plate members 24*a*, 24*b*, and by movement of the first rollers 78 along the guide grooves 84*a* that extend in parallel with the base 22, the first rollers 78 are guided in substantially horizontal directions (the directions of arrows C and D). More specifically, the one end portions of the first link arms 74*a*, 74*b*, on which the first rollers 78 are pivotally supported, are displaced only in substantially horizontal directions under a guiding action of the first guide members 84.

On the other hand, a second roller pin (second support member) 86 is disposed on the other end portions of each pair of the first link arms 74*a*, 74*b*, and one pair of the second rollers 80 are provided on outer sides of the other end portions of each pair of the first link arms 74*a*, 74*b*. Each pair of the second rollers 80 are supported rotatably by the second roller pin 86, and the other end portion of each of the second link arms 76*a*, 76*b* is pivotally supported by the second roller pin 86 between the pair of the first link arms 74*a*, 74*b*.

The second rollers 80 are inserted in guide grooves (grooves) 88*a* of a pair of second guide members (guide means) 88, which are disposed respectively on inner wall surfaces of the pair of plate members 24*a*, 24*b*, and by movement of the second rollers 80 along the guide grooves 88*a* that extend in vertical directions perpendicular to the base 22, the second rollers 80 are guided in substantially vertical directions. More specifically, the other end portions of the first link arms 74*a*, 74*b*, and the second link arms 76*a*, 76*b*, on which the second rollers 80 are pivotally supported, are displaced only in substantially vertical directions (the directions of arrows A and B) under a guiding action of the second guide members 88.

In this manner, the first link arms 74*a*, 74*b* connect the other ends of the first and second piston rods 46, 48 that constitute the drive unit 18, to the other ends of the second link arms 76*a*, 76*b*. The first link arms 74*a*, 74*b* are supported rotatably with respect to the first and second piston rods 46, 48 and the second link arms 76*a*, 76*b*, and transmit the driving force of the drive unit 18 to the second link arms 76*a*, 76*b*.

The second link arms 76*a*, 76*b*, in the same manner as the first link arms 74*a*, 74*b*, are formed as plate-shaped members having a predetermined length in the longitudinal direction thereof. The second link arms 76*a*, 76*b* are disposed rotatably in a state of being connected respectively to the first link arms 74*a*, 74*b* through the second roller pins 86, which are pivotally supported on the other end portions thereof, and being connected respectively to the first and second clamp arms 14, 16 through the link pins 36, which are pivotally supported on the one end portions. In addition, the second link arms 76*a*, 76*b* transmit the driving force that was transmitted to the first link arms 74*a*, 74*b* onto the first and second clamp arms 14, 16 to thereby rotate the first and second clamp arms 14, 16.

The clamp apparatus 10 according to the embodiment of the present invention is basically constructed as described above. Next, operations and advantages of the clamp apparatus 10 will be described. In the following description, the unclamped condition shown in FIG. 4, in which the gripping portions 34 of the first and second clamp arms 14, 16 are separated mutually, will be referred to as an initial position.

In the initial position, pressure fluid is supplied to the interior of the cylinder tube 40 through the second and third ports 60, 62, whereby the first piston 42 and the second piston 44 are displaced by the pressure fluid in directions to mutually approach each other toward a center region of the cylinder-tube 40.

A brief description will now be given concerning the workpiece W, which is gripped by the above-described clamp apparatus 10.

Figure 4:
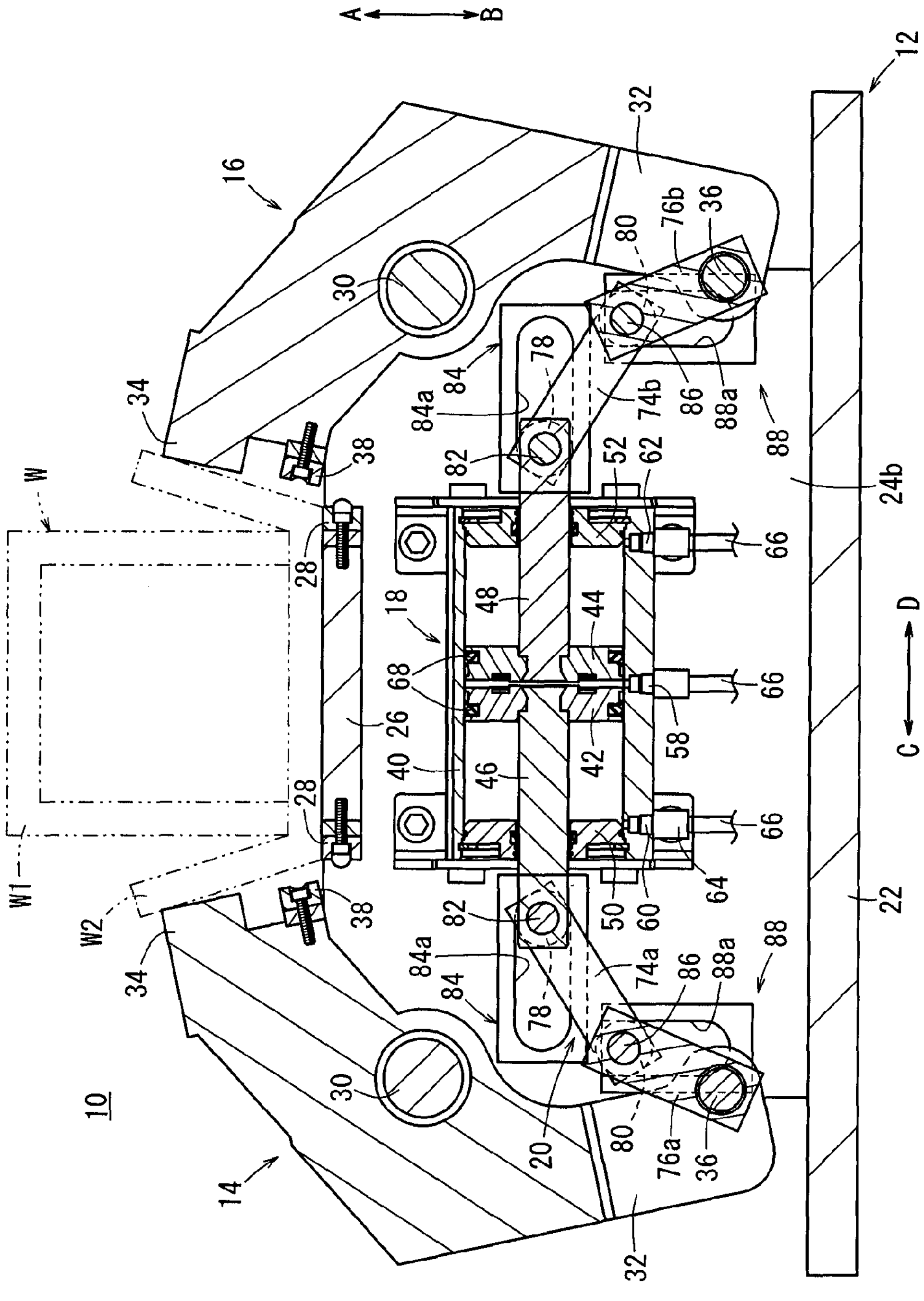
FIG. 4 is an overall cross sectional view of the clamp apparatus of FIG. 1 in an unclamped condition.
Figure 5:
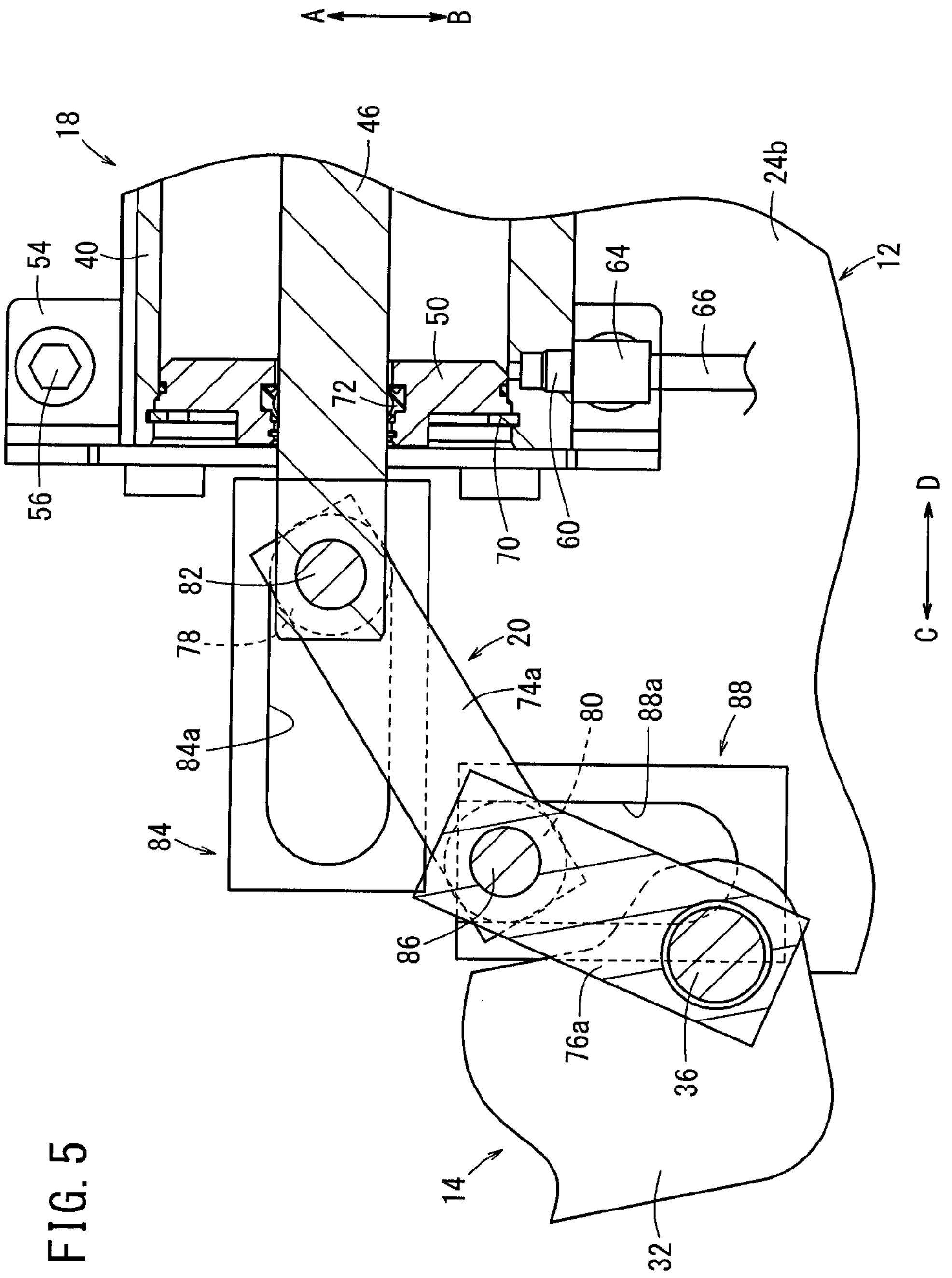
FIG. 5 is an enlarged cross sectional view showing the vicinity of the driving force transmission mechanism in the clamp apparatus of FIG. 4.

For example, as shown in FIGS. 1 and 4, the workpiece W is made up from a first frame W1, which is U-shaped in cross section, and a second frame W2, which is U-shaped in cross section and is assembled together with the first frame W1 to thereby constitute a vehicle frame.

The first frame W1 is placed between the gripping portions 34 of the first and second clamp arms 14, 16 with the opening thereof oriented downward (in the direction of the arrow B), whereas the second frame W2 is mounted on the ceiling portion 26 with the opening thereof oriented upward (in the direction of the arrow A), and with the side walls thereof inclined such that the distance between the side walls gradually widens toward the side of the opening, and with the first frame W1 being inserted in the interior of the second frame W2.

Stated otherwise, the second frame W2 is arranged on an outer side with respect to the first frame W1, and the side walls of the second frame W2 are inclined so as to widen toward the first and second clamp arms 14, 16.

In this state where the workpiece W is set in a predetermined position on the clamp apparatus 10, first, under switching operation of the non-illustrated switching device, the pressure fluid that was supplied to the second and third ports 60, 62 instead is supplied to the first port 58. In this case, the second and third ports 60, 62 are placed in a state of being open to atmosphere.

Accordingly, as shown in FIG. 1, by the pressure fluid that is introduced into the cylinder tube 40, the first and second pistons 42, 44 are pressed in directions to separate away from one another mutually, whereby the first and second piston rods 46, 48 and the first rollers 78 are displaced respectively together with the first and second pistons 42, 44 toward the first and second clamp arms 14, 16.

Along therewith, the one end portions of the first link arms 74*a*, 74*b* are pressed in directions to separate away from the drive unit 18 under a guiding action of the first rollers 78, which are guided along the guide grooves 84*a* of the first guide members 84. The first link arms 74*a*, 74*b* rotate about the first roller pins 82, whereby the second rollers 80, which are supported pivotally on other end sides thereof, move downward (in the direction of the arrow B) along the guide grooves 88*a* of the second guide member 88.

In addition, accompanying the downward movement of the second rollers 80, the other end portions of the second link arms 76*a*, 76*b* also move downward (in the direction of the arrow B), whereby the second link arms 76*a*, 76*b*, via the link pins 36, press the one end portions of the first and second clamp arms 14, 16 in directions to separate mutually away from each other.

Consequently, the first and second clamp arms 14, 16 are rotated mutually about the arm pins 30 in directions in which the gripping portions 34 approach one another, and the side walls of the second frame W2 are pressed and deformed by the gripping portions 34 so as to approach each other mutually, whereby the side walls of the second frame W2 abut against the side walls of the first frame W1, and the side walls of the first and second frames W1, W2 become substantially parallel to each other. Thus, a clamped state in which clamping is completed is brought about (see FIG. 1).

At this time, the positioning portions 38 are engaged respectively with the receiving grooves 28 of the body 12, so that during clamping, the first and second clamp arms 14, 16 are positioned at predetermined stop positions, and further rotation of the first and second clamp arms 14, 16 is prohibited.

Figure 2:
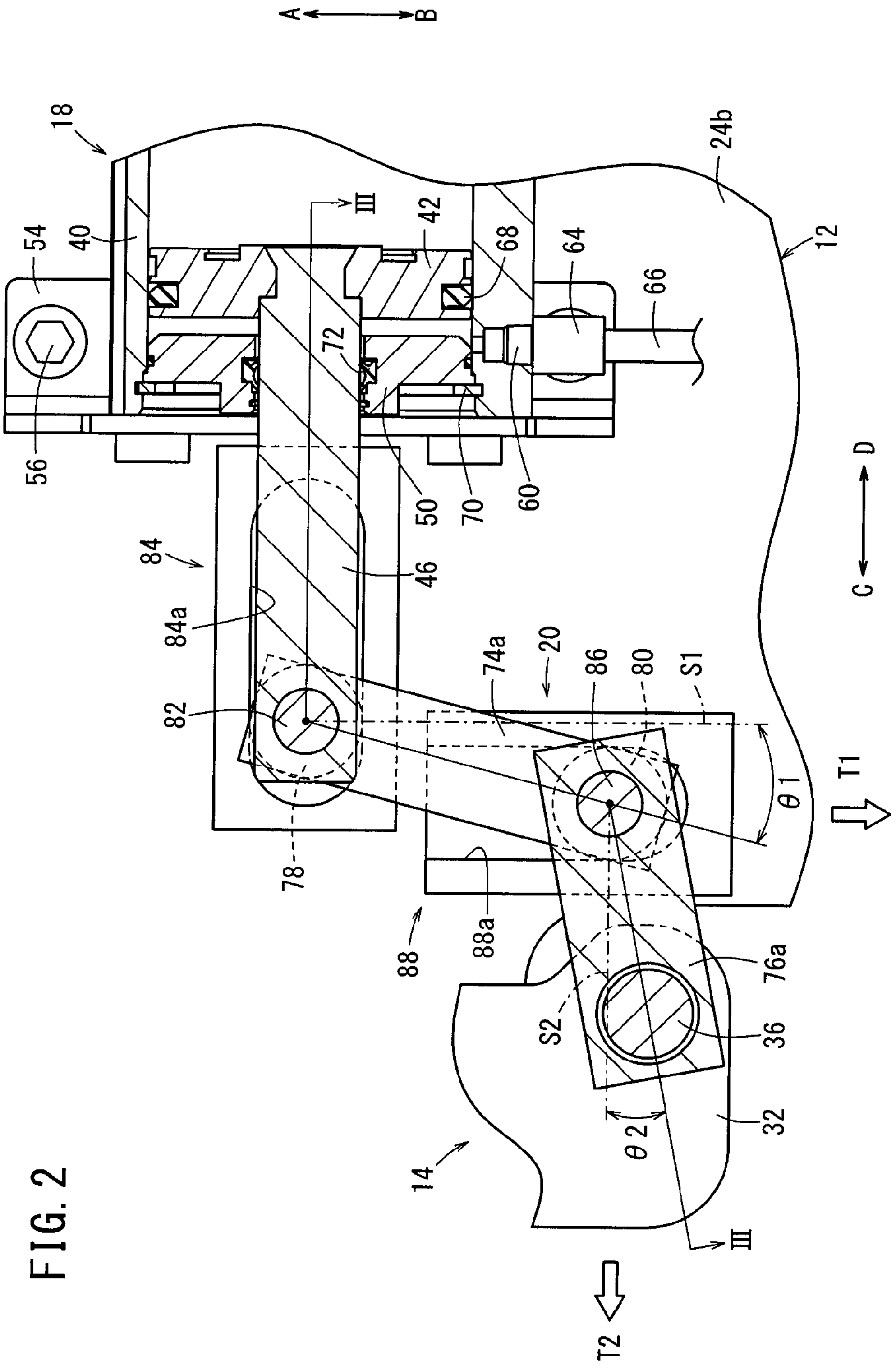
FIG. 2 is an enlarged cross sectional view showing the vicinity of a driving force transmission mechanism in the clamp apparatus of FIG. 1.

Further, at this time, as shown in FIG. 2, the first link arm 74*a* (74*b*) is inclined at a first toggle angle θ1 toward the first clamp arm 14 (second clamp arm 16) with respect to a vertical line S1 passing through the center of the first roller pin 82.

Owing thereto, the driving force output from the drive unit 18 is boosted in power and is transmitted to the second link arm 76*a* (76*b*) as a thrust force T1, and since the second link arm 76*a* (76*b*) is inclined at a second toggle angle θ2 toward the base 22 (in the direction of the arrow B) with respect to a horizontal line S2 passing through the center of the second roller pin 86, the thrust force T1 is further boosted in power and is transmitted to the one end of the first clamp arm 14 (second clamp arm 16) as a thrust force T2.

More specifically, the first link arms 74*a*, 74*b* and the second link arms 76*a*, 76*b* function as a toggle link mechanism, which is capable of boosting the driving force from the drive unit 18 and transmitting the power-boosted driving force to the first and second clamp arms 14, 16. In addition, the driving force output from the drive unit 18 can be boosted in power by the first link arms 74*a*, 74*b* and the second link arms 76*a*, 76*b* that make up the driving force transmission mechanism 20.

Further, as shown in FIG. 1, each of the first and second clamp arms 14, 16 is formed such that the length (second distance L2) from the arm pin 30 toward the one end side thereof is longer than the length (first distance L1) from the arm pin 30 toward the other end side thereof. Therefore, when the workpiece W is clamped by the first and second clamp arms 14, 16, the driving force transmitted from the driving force transmission mechanism 20 is boosted in power by the length ratio (L2/L1) between the first distance L1 and the second distance L2, whereby the workpiece W can be gripped with the thus-increased clamping force.

More specifically, since the driving force output from the drive unit 18 is boosted by the first link arms 74*a*, 74*b* and the second link arms 76*a*, 76*b* of the driving force transmission mechanism 20, together with enabling the workpiece W to be clamped by further boosting the power and through rotation of the first and second clamp arms 14, 16, it is unnecessary for a large scale drive unit 18 to be provided in order to obtain a predetermined clamping force, and substantially the same clamping force can be obtained by a small scale drive unit 18.

In addition, in a condition in which the first and second frames W1, W2 are clamped by the first and second clamp arms 14, 16, the side walls of the first and second frames W1, W2 are welded to each other by a non-illustrating welding apparatus, for example.

On the other hand, in the event that the clamped state shown in FIG. 1 of the workpiece W by the first and second clamp arms 14, 16 is to be released, under switching operation of the non-illustrated switching device, the pressure fluid that was supplied to the first port 58 of the drive unit 18 is once again supplied to the second and third ports 60, 62. Moreover, in this case, the pressure fluid is supplied such that the amount of pressure fluid supplied with respect to the second and third ports 60, 62 is the same, and the first port 58 is placed in a state of being open to atmosphere.

Consequently, under a pressing action of the pressure fluid, the first and second pistons 42, 44 are displaced in directions to approach each other, whereupon the first and second piston rods 46, 48 and the first rollers 78 are displaced integrally therewith. In addition, accompanying displacement of the first rollers 78, the one end portions of the first link arms 74*a*, 74*b* are displaced toward the drive unit 18, whereas the second rollers 80 disposed on the other end portions thereof are moved upwardly under a guiding action of the second guide members 88. Along therewith, the second link arms 76*a*, 76*b* are rotated, and then the one end portions of the first and second clamp arms 14, 16 are pulled so as to approach one another mutually, whereby the first and second clamp arms 14, 16 are rotated about the arm pins 30 in directions to cause the gripping portions 34 to separate away from each other. Thus, as shown in FIG. 4, an unclamped state is brought about in which clamping of the workpiece W is released.

In the foregoing manner, according to the present embodiment, in the clamp apparatus 10 equipped with the drive unit 18 having the pair of first and second pistons 42, 44, the driving force, which is output upon displacement of the first and second pistons 42, 44, is transmitted to the first and second clamp arms 14, 16, respectively, through the driving force transmission mechanism 20. Thus, when the workpiece W is clamped, owing to the fact that the first link arms 74*a*, 74*b* are inclined at the first toggle angle θ1 toward the first and second clamp arms 14, 16 with respect to vertical lines S1 passing through the center of the first roller pins 82, and the fact that the second link arms 76*a*, 76*b* are inclined at the second toggle angle θ2 toward the base 22 with respect to horizontal lines S2 passing through the center of the second roller pins 86, the driving force is boosted in power respectively by the first link arms 74*a*, 74*b* and the second link arms 76*a*, 76*b*, whereby the thus-increased driving force can be transmitted to the one end portions of the first and second clamp arms 14, 16.

As a result, even though the driving force output by the drive unit 18 may be small, the driving force can be boosted in power by using the two toggle link mechanisms constituted from the first link arms 74*a*, 74*b* and the second link arms 76*a*, 76*b*. Owing thereto, the workpiece W can be clamped at a desired clamping force by the first and second clamp arms 14, 16 and, for example, even in the case that a large clamping force is required, such a large clamping force can be provided by a drive unit 18 (fluid pressure cylinder) that produces a small output. Thus, it is unnecessary for the clamp apparatus to be increased in scale, and since the amount of pressure fluid consumed in the drive unit 18 can be suppressed, energy savings and a reduction in running costs can be realized.

Further, concerning the first and second clamp arms 14, 16, the length (second distance L2) from the arm pin 30 to the one end side thereof connected to the link pin 36 is set to be longer than the length (first distance L1) from the arm pin 30 to the gripping portion 34 on the other end side thereof. Therefore, the driving force is further boosted in power by the length ratio (L2/L1), and the workpiece W can be clamped with the thus-increased clamping force upon rotation of the first and second clamp arms 14, 16. As a result, compared to a case of boosting power only with the driving force transmission mechanism 20 (toggle link mechanism) made up from the aforementioned first link arms 74*a*, 74*b* and the second link arms 76*a*, 76*b*, a desired clamping force can be obtained using an even smaller drive unit 18, and together therewith, the clamp apparatus 10 can be made even smaller in scale, with even greater energy savings, and a further reduction in running costs can be realized.

Furthermore, for example, by connecting respective speed control valves to the tubes 66, which are connected with respect to the second and third ports 60, 62 of the cylinder tube 40 that constitutes the drive unit 18, when the workpiece W is clamped by supplying pressure fluid to the first port 58, the discharge amount of the pressure fluid discharged from the second port 60 can be made different from the discharge amount of the pressure fluid discharged from the third port 62, and thus, the rotational speed of the first clamp arm 14 and the rotational speed of the second clamp arm 16 can be changed.

For example, if the amount of pressure fluid discharged from the second port 60 is large, whereas the amount of pressure fluid discharged from the third port 62 is small, then the rotational speed of the first clamp arm 14 can be made faster, and the rotational speed of the second clamp arm 16 can be delayed or made slower with respect to the rotational speed of the first clamp arm 14. Owing thereto, the gripping portion 34 of only the first clamp arm 14 is brought into abutment first against the workpiece W in order to position the workpiece W, and thereafter, the gripping portion 34 of the second clamp arm 16 is later brought into abutment against the workpiece W to clamp the workpiece W between the first and second clamp arms 14, 16. Consequently, in the clamp apparatus 10, the workpiece W can be clamped reliably at a predetermined position without the need of performing a positioning operation of the workpiece W separately, and therefore, efficiency of clamping operation can be improved.

The clamp apparatus according to the present invention is not limited to the above embodiment. Various changes and modifications may be made to the embodiment without departing from the scope of the invention as set forth in the appended claims.

The invention claimed is:

1. A clamp apparatus for rotating a pair of clamp arms and thereby clamping a workpiece between the clamp arms, comprising:

a body;

a driver disposed on the body and to displace displaceable members along an axial direction under supply of a pressure fluid;

the pair of clamp arms supported rotatably with respect to the body, the clamp arms being disposed in confronting relation to each other; and a driving force transmission mechanism which connects ends of the displaceable members to ends of the clamp arms, and which transmits a driving force in the axial direction of the driver to the clamp arms to thereby rotate the clamp arms, wherein the driving force transmission mechanism comprises a toggle link mechanism having first link arms supported rotatably on the displaceable members through first support members provided on ends of the first link arms, and second link arms, which connect second support members provided on other ends of the first link arms and ends of the clamp arms, the second link arms supported rotatably, respectively, with respect to the second support members and the ends of the clamp arms, and wherein the first support members are disposed for displacement in the axial direction, and the second support members are disposed for displacement in a perpendicular direction perpendicular to the direction of displacement of the first support members.

2. The clamp apparatus according to claim 1, wherein the first and second support members are guided respectively in the axial direction and the perpendicular direction by respective guide disposed on the body.

3. The clamp apparatus according to claim 2, wherein the guide comprises:

first guide members that guide the first support members in a horizontal direction; and second guide members that guide the second support members in a vertical direction, wherein rotating rollers, which are inserted in grooves of the first and second guide members, are disposed on the first and second support members.

4. The clamp apparatus according to claim 1, wherein each of the clamp arms is disposed rotatably through a support shaft with respect to the body, and a distance from one end connected to the driving force transmission mechanism to the support shaft is set to be longer than a distance from a gripping portion that grips the workpiece to the support shaft.

5. The clamp apparatus according to claim 1, wherein the driver comprises a fluid pressure cylinder having first and second ports to which a pressure fluid is supplied, and a cylinder main body in which the displaceable members are displaceably disposed, the displaceable members comprising a pair of pistons, wherein by supply of the pressure fluid through the first port, the pistons are displaced in directions to separate away from each other mutually, and by supply of the pressure fluid through the second ports, the pistons are displaced in directions to approach each other mutually.

6. The clamp apparatus according to claim 1, wherein the displaceable members are displaceable in opposite direction to one another in the axial direction.

7. The clamp apparatus according to claim 6, wherein each of the displaceable members corresponds to one of the first support members and move as one with the corresponding first support member.

* * * * *